(No Model.)
L. A. TURNER.
RAIL CLIMBER FOR VEHICLE WHEELS.
No. 424,584. Patented Apr. 1, 1890.
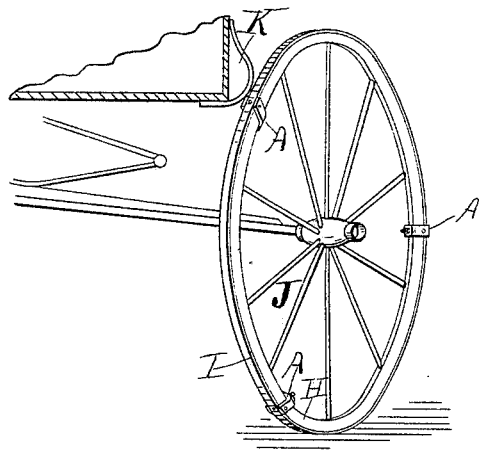
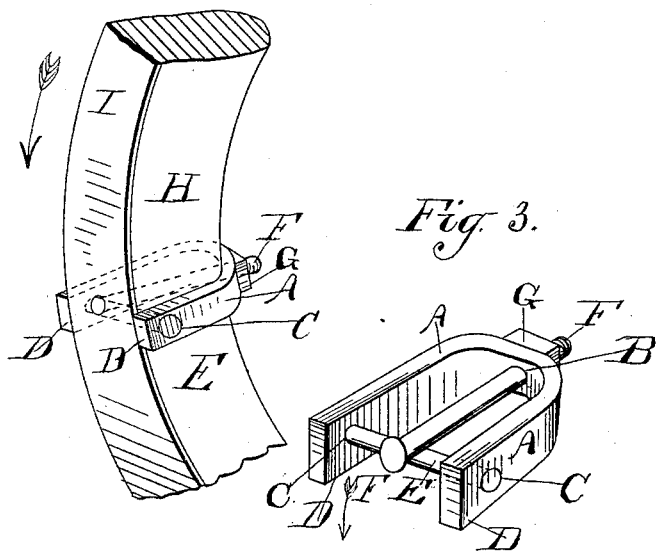
Witnesses.
B. M. Whitaker.
M. C. Galer.
Inventor
Lewis A. Turner
by Hazard & Townsend
his attorneys.

UNITED STATES PATENT OFFICE.

LEWIS A. TURNER, OF LOS ANGELES, CALIFORNIA, ASSIGNOR OF ONE-HALF TO WILLIAM D. BABCOCK, OF SAME PLACE.

RAIL-CLIMBER FOR VEHICLE-WHEELS.

SPECIFICATION forming part of Letters Patent No. 424,584, dated April 1, 1890.

Application filed January 21, 1890. Serial No. 337,626. (No model.)

*To all whom it may concern:*

Be it known that I, LEWIS A. TURNER, a citizen of the United States, residing in Los Angeles city and county, State of California, have invented a new and useful Improvement in Rail-Climbers for Vehicle-Wheels, of which the following is a specification.

My invention relates to devices designed to assist vehicle-wheels in crossing street-railway and other railway tracks.

The object of my invention is to provide a cheap, simple, and easily-adjusted attachment which can be conveniently applied to ordinary vehicle-wheels, and which will enable such wheels to readily pass over street-railway and other railway tracks without danger of injury to such wheels.

The accompanying drawings illustrate my invention.

Figure 1 represents a fragment of a vehicle the wheel of which is provided with my invention. Fig. 2 represents a fragment of a wheel provided with my invention. Fig. 3 is a view of my rail-climbing attachment detached from the wheel.

My attachment consists of a U-shaped clip A, provided with an axial bolt-hole B through its bow and provided with the two transverse bolt-holes C C, one at the end of each of its members D, a transverse rivet-bolt E, passing through the transverse bolt-holes, a tire-rivet screw-bolt F, passing through the axial bolt-hole, and a nut G, screwing upon the end of such bolt.

In practice my invention is used in combination with the perforated felly H and tire I of the vehicle-wheel J.

To adjust the attachment upon the wheel of a vehicle, one of the bolts ordinarily employed to secure the tire of a wheel to its felly is removed and a hole is bored transversely through the felly on the forward or under side of the bolt-hole from which such bolt was removed. By the term "forward" or "under" side, I mean that side of such bolt-hole toward which the wheel rotates. (In the drawings the arrows indicate the direction of rotation.) The clip is then placed to clasp the felly, care being had that its arms D are of such length as to come approximately flush with the face of the tire. The rivet-headed tire screw-bolt F is then passed through the tire, felly, and bow of the clip, and the nut G is screwed firmly thereon, thus clamping the clip, tire, and felly firmly together. The transverse rivet-bolt E is then passed through the transverse bolt-holes, where it engages with the under side of the tire-bolt F and is securely riveted to the members.

Fig. 3 clearly shows the relative positions of the clip and its bolts when in use. The tire-bolt F, which passes through the tire and the bow of the clip, forms a firm support for the transverse rivet-bolt E. When the wheel strikes upon a rail of a street-railway or other railway, it will slip thereon until the end of one of the arms D strikes the rail. The strain is transferred through the transverse bolt E to tire-bolt F, and from thence to the tire principally, although a portion of the strain is borne by the clip and by the wood of the felly. When the member D strikes the track, the wheel mounts the rail.

A suitable curved guard K should be attached to the box of the vehicle to prevent the attachment from catching upon the box. Each wheel may be supplied with a number of the clips, as shown in Fig. 1.

Now, having described my invention, what I claim as new, and desire to secure by Letters Patent, is—

1. The rail-climbing attachment for vehicle-wheels, consisting of a U-shaped clip provided with a bolt-hole through its bow and provided with the two transverse bolt-holes, one at the end of each of its members, a transverse rivet-bolt passing through the transverse bolt-holes, a tire-rivet screw-bolt passing through the axial bolt-hole, and a nut screwing upon the end of such screw-bolt.

2. The combination of the U-shaped clip provided with a bolt-hole through its bow and provided with two transverse bolt-holes, one at the end of each of its members, the perforated felly and tire of the wheel, a transverse rivet passing through the felly and transverse bolt-holes, the tire-bolt passing through the tire, felly, and bow, and the nut screwing upon the end of such bolt.

3. The combination of the clip, the tire, the felly, the tire-bolt secured to the bow and tire, and the transverse bolt secured to the members and passing through the felly to engage with the under side of the axial bolt.

LEWIS A. TURNER.

Witnesses:
JAMES R. TOWNSEND,
WM. D. BABCOCK.